United States Patent
Ogi et al.

(10) Patent No.: US 9,815,963 B2
(45) Date of Patent: Nov. 14, 2017

(54) AGGLOMERATED SILICA, RUBBER COMPOSITION, TIRE, PRODUCING METHOD OF AGGLOMERATED SILICA, AND PRODUCING METHOD OF RUBBER COMPOSITION

(71) Applicant: HARIMA CHEMICALS, INCORPORATED, Hyogo (JP)

(72) Inventors: Takeshi Ogi, Kakogawa (JP); Lin Zhou, Kakogawa (JP); Naoki Miyamoto, Kakogawa (JP)

(73) Assignee: HARIMA CHEMICALS, INCORPORATED, Hyogo (JP)

(*) Notice: Subject to any disclaimer, the term of this patent is extended or adjusted under 35 U.S.C. 154(b) by 0 days.

(21) Appl. No.: 14/915,511

(22) PCT Filed: Aug. 27, 2014

(86) PCT No.: PCT/JP2014/072444
§ 371 (c)(1),
(2) Date: Feb. 29, 2016

(87) PCT Pub. No.: WO2015/030056
PCT Pub. Date: Mar. 5, 2015

(65) Prior Publication Data
US 2016/0208074 A1 Jul. 21, 2016

(30) Foreign Application Priority Data
Aug. 30, 2013 (JP) .................. 2013-178893

(51) Int. Cl.
| | |
|---|---|
| *C08K 3/36* | (2006.01) |
| *C09C 1/30* | (2006.01) |
| *B60C 1/00* | (2006.01) |
| *C08K 9/08* | (2006.01) |
| *C08J 3/21* | (2006.01) |
| *C08J 3/20* | (2006.01) |
| *C08L 9/06* | (2006.01) |
| *C08L 93/04* | (2006.01) |

(52) U.S. Cl.
CPC .................. *C08K 3/36* (2013.01); *B60C 1/00* (2013.01); *C08J 3/203* (2013.01); *C08J 3/212* (2013.01); *C08K 9/08* (2013.01); *C08L 9/06* (2013.01); *C09C 1/309* (2013.01); *C09C 1/3036* (2013.01); *C09C 1/3072* (2013.01); *C01P 2004/51* (2013.01); *C01P 2004/64* (2013.01); *C01P 2006/10* (2013.01); *C01P 2006/12* (2013.01); *C08J 2309/06* (2013.01); *C08J 2393/04* (2013.01); *C08J 2409/00* (2013.01); *C08J 2493/04* (2013.01); *C08L 93/04* (2013.01); *C08L 2205/02* (2013.01); *C08L 2205/03* (2013.01)

(58) Field of Classification Search
CPC ............ C08K 3/36; C08K 9/08; C09C 1/3072
See application file for complete search history.

(56) References Cited

U.S. PATENT DOCUMENTS 5,777,013 A * 7/1998 Gardiner .................. B60C 1/00
524/270

FOREIGN PATENT DOCUMENTS

| | | |
|---|---|---|
| CN | 1241591 A | 1/2000 |
| CN | 1243134 A | 2/2000 |
| CN | 102532621 A | 7/2012 |
| EP | 0 607 653 A1 | 7/1994 |
| EP | 0 700 960 A1 | 3/1996 |
| EP | 0 700 964 A1 | 3/1996 |
| EP | 0 855 423 A1 | 7/1998 |
| JP | 54090237 A * | 7/1979 |
| JP | 06-200125 A | 7/1994 |
| JP | 6-211515 A | 8/1994 |
| JP | 2011-057967 A | 3/2011 |
| JP | 2012-052028 A | 3/2012 |

OTHER PUBLICATIONS

Machine translation of JP 54-90237 A, published Jul. 17, 1979.*
Derwent abstract 1979-33983B for JP 54-37136, published Mar. 19, 1979.*
PCT International Preliminary Report on Patentability (IPRP) and Written Opinion dated Mar. 10, 2016, in corresponding International Application No. PCT/JP2014/072444 (10 pages).
International Search Report (PCT/ISA/210) dated Dec. 2, 2014, by the Japanese Patent Office as the International Searching Authority for International Application No. PCT/JP2014/072444.

* cited by examiner

*Primary Examiner* — Vickey Nerangis
(74) *Attorney, Agent, or Firm* — Buchanan, Ingersoll & Rooney PC

(57) ABSTRACT

Agglomerated silica is obtained by mixing silica with a rosin resin to be agglomerated.

5 Claims, 2 Drawing Sheets

AGGLOMERATED SILICA, RUBBER COMPOSITION, TIRE, PRODUCING METHOD OF AGGLOMERATED SILICA, AND PRODUCING METHOD OF RUBBER COMPOSITION

TECHNICAL FIELD

The present invention relates to agglomerated silica, a rubber composition, a tire, a method for producing agglomerated silica, and a method for producing a rubber composition.

BACKGROUND ART

It has been recently known that in view of reduction in rolling resistance and improvement of low fuel consumption, a silica powder, as a filler, is contained in a vehicle tire or the like.

Such a silica powder is usually blended in a rubber composition that is a material of the vehicle tire or the like. However, there is a disadvantage that the silica powder easily scatters, so that the usability thereof at the time of mixing is poor, and the non-uniform scattering amount causes unevenness in the mixing amount, so that the quality of products is non-uniform.

Thus, it has been considered that silica is used by being agglomerated so as to prevent the scattering of the silica. To be specific, as a method for agglomerating the silica, for example, a method in which water, an organic solvent, or a mixture thereof are added to powdered silica to be stirred and agglomerated has been proposed (ref: Patent Document 1).

CITATION LIST

Patent Document

Patent Document 1: Japanese Unexamined Patent Publication No. H6-211515

SUMMARY OF THE INVENTION

Problem to be Solved by the Invention

Meanwhile, when agglomerated silica is blended in a vulcanizable rubber composition, improvement of the vulcanizing rate is desired in order to improve the productivity.

It is an object of the present invention to provide agglomerated silica that is capable of improving the vulcanizing rate at the time of being blended in a vulcanizable rubber composition, a rubber composition that contains the agglomerated silica, a tire that is obtained by using the rubber composition, furthermore, a method for producing agglomerated silica, and a method for producing a rubber composition.

Means for Solving the Problem

Agglomerated silica of the present invention are obtained by mixing silica with a rosin resin to be agglomerated.

A rubber composition of the present invention contains the above-described agglomerated silica, a rubber component, and a vulcanizing agent.

A tire of the present invention is obtained by using the above-described rubber composition.

A method for producing agglomerated silica of the present invention includes mixing of silica with a rosin resin to be agglomerated.

A method for producing a rubber composition of the present invention includes the steps of producing agglomerated silica by mixing silica with a rosin resin to be agglomerated and mixing the agglomerated silica, a rubber component, and a vulcanizing agent.

Effect of the Invention

The agglomerated silica of the present invention contain the rosin resin, so that when the agglomerated silica is blended in a vulcanizable rubber composition, improvement of the vulcanizing rate can be achieved.

The rubber composition and the tire of the present invention contain the agglomerated silica of the present invention, so that the vulcanizing rate is excellent.

According to the method for producing agglomerated silica of the present invention, the agglomerated silica that is capable of improving the vulcanizing rate at the time of being blended in the vulcanizable rubber composition can be efficiently obtained.

According to the method for producing a rubber composition of the present invention, the rubber composition having excellent vulcanizing rate can be obtained.

DESCRIPTION OF EMBODIMENTS

Figure 1:
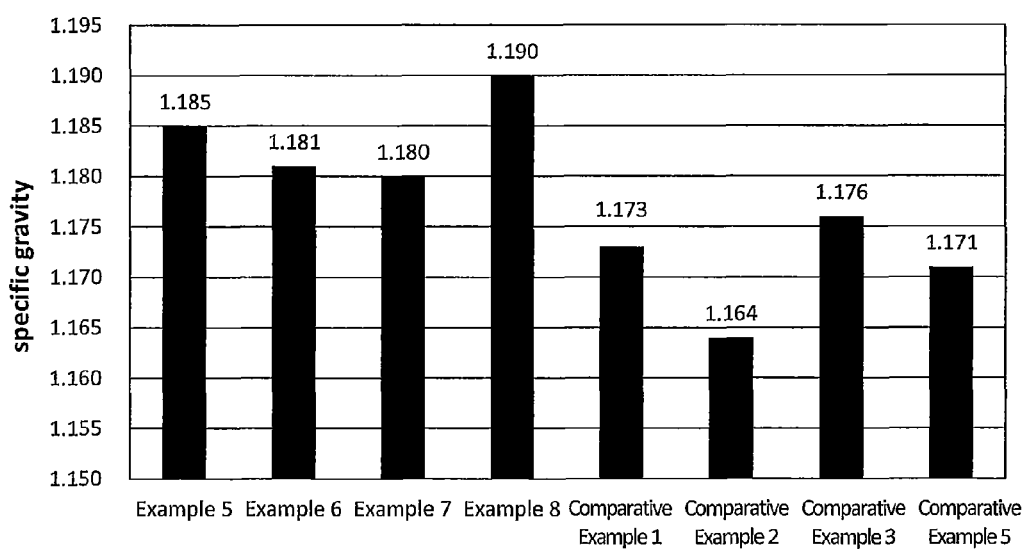
FIG. 1 shows a graph illustrating the specific gravity of each of the rubber compositions obtained in Examples and Comparative Examples.

Agglomerated silica of the present invention can be obtained by mixing silica (silicon dioxide, $SiO_2$) with a rosin resin to be agglomerated (to be granulated).

The silica is not particularly limited and known silica can be used. Specific examples thereof include wet silica, dry silica, and colloidal silica. Preferably, wet silica is used.

The wet silica can be, for example, obtained as a precipitate by neutralizing an aqueous solution of sodium silicate with sulfuric acid or the like and can be, for example, collected by filtration or the like. The wet silica can be, for example, used as a silica cake in a state of containing water, a silica slurry obtained by destroying the silica cake, or powdered silica in a state of being dried (state of being water-agglomerated).

The silica (non-agglomerated product) has a volume average primary particle size of, for example, 5 nm or more, or preferably 20 nm or more, and, for example, 100 nm or less, or preferably 50 nm or less.

The silica (non-agglomerated product) has a BET specific surface area (measured in accordance with ISO5794/1) of, for example, 40 $m^2/g$ or more, preferably 80 $m^2/g$ or more, or more preferably 120 $m^2/g$ or more, and, for example, 350 $m^2/g$ or less.

When the BET specific surface area is within the above-described range, both of the dispersibility into a rubber component at the time of being blended thereto and the reinforcing properties of reinforcing the rubber can be achieved.

When the volume average primary particle size and the BET specific surface area of the silica are within the above-described range, agglomeration can be further more surely achieved.

A commercially available product can be also used as the silica. To be specific, examples of the commercially available product of the silica include trade name: "Nipsil AQ" (BET specific surface area of 205 $m^2/g$, manufactured by Tosoh Silica Corporation), trade name: "ULTRASIL VN3" (BET specific surface area of 170 $m^2/g$, manufactured by EVONIK INDUSTRIES), and trade name: "NEWSIL 175GR" (BET specific surface area of 165 to 185 $m^2/g$, manufactured by Quechen Silicon Chemical Co., Ltd.).

The silica may be used alone or the silica having different volume average primary particle sizes and different BET specific surface areas may be used in combination.

Examples of the rosin resin include rosins and rosin derivatives.

Examples of the rosins include a tall rosin, a gum rosin, and a wood rosin. The rosins are a concept including a disproportionated rosin, a polymerized rosin, a hydrogenated rosin, and another chemically modified rosin or a purified product of these.

Examples of the rosin derivatives include rosin esters, unsaturated carboxylic acid-modified rosins, unsaturated carboxylic acid-modified rosin esters, rosin-modified phenols, and rosin alcohols obtained by subjecting a carboxy group of rosins or rosins modified with unsaturated carboxylic acid to reduction treatment.

The rosin esters can be, for example, obtained by allowing the above-described rosins and a polyhydric alcohol to react by a known esterification method.

Examples of the polyhydric alcohol include dihydric alcohols such as ethylene glycol, propylene glycol, neopentyl glycol, trimethylene glycol, tetramethylene glycol, 1,3-butanediol, and 1,6-hexanediol; trihydric alcohols such as glycerin, trimethylol propane, trimethylol ethane, and triethylol ethane; tetrahydric alcohols such as pentaerythritol and dipentaerythritol; and amino alcohols such as triethanolamine, tripropanolamine, triisopropanolamine, N-isobutyl diethanolamine, and N-normalbutyl diethanolamine. Examples of the polyhydric alcohol also include polyalkylene oxides such as polyethylene polyol, polypropylene polyol, and polyethylene polypropylene polyol (random or block copolymer). The polyalkylene oxide can be, for example, obtained by subjecting an alkylene oxide such as ethylene oxide and/or propylene oxide to addition reaction with the above-described dihydric alcohol or polyamine as an initiator. In view of improvement of the vulcanizing properties of a rubber composition (described later) and that of the mechanical strength and the low fuel consumption of a tire (described later), the average addition mole number of the alkylene oxide in the polyalkylene oxide is, for example, 10 mols or more, or preferably 15 mols or more, and, for example, 50 mols or less, preferably 45 mols or less, or more preferably 40 mols or less.

These polyhydric alcohols may be used alone or in combination of two or more.

As the polyhydric alcohol, preferably, a polyalkylene oxide is used.

In the mixing ratio of the rosins to the polyhydric alcohols, the molar ratio (OH/COOH) of the hydroxyl group of the polyhydric alcohol with respect to the carboxy group of the rosins is, for example, 0.2 to 1.2. In the reaction of the rosins with the polyhydric alcohols, the reaction temperature is, for example, 150 to 300° C. and the reaction time is, for example, 2 to 30 hours. In the reaction, a known catalyst can be blended at an appropriate proportion as needed.

The unsaturated carboxylic acid-modified rosins can be, for example, obtained by allowing α,β-unsaturated carboxylic acids to react with the above-described rosins by a known method.

Examples of the α,β-unsaturated carboxylic acids include an α,β-unsaturated carboxylic acid and an acid anhydride thereof. To be specific, examples thereof include fumaric acid, maleic acid, maleic anhydride, itaconic acid, citraconic acid, citraconic anhydride, acrylic acid, and methacrylic acid. These α,β-unsaturated carboxylic acids may be used alone or in combination of two or more.

In the mixing ratio of the rosins to the α,β-unsaturated carboxylic acids, the ratio of the α,β-unsaturated carboxylic acids with respect to 1 mol of the rosin is, for example, 1 mol or less. In the reaction of the rosins with the α,β-unsaturated carboxylic acids, the reaction temperature is, for example, 150 to 300° C. and the reaction time is, for example, 1 to 24 hours. In the reaction, a known catalyst can be blended at an appropriate proportion as needed.

The unsaturated carboxylic acid-modified rosin esters can be, for example, obtained by allowing the above-described polyhydric alcohols and the above-described α,β-unsaturated carboxylic acids to sequentially or simultaneously react with the above-described rosins.

When the above-described components are allowed to sequentially react, first, the rosins and the polyhydric alcohol are allowed to react and thereafter, the α,β-unsaturated carboxylic acids are allowed to react, or, first, the rosins and the α,β-unsaturated carboxylic acids are allowed to react and thereafter, the polyhydric alcohol is allowed to react. The reaction conditions in the esterification reaction of the rosins with the polyhydric alcohol and in the modification reaction of the rosins with the α,β-unsaturated carboxylic acids are the same as those described above.

Examples of the rosin derivatives further include an amide compound of rosin and an amine salt of rosin.

The amide compound of rosin can be, for example, obtained by allowing the above-described rosins to react with an amidating agent.

Examples of the amidating agent include a primary and/or secondary polyamine compound, a polyoxazoline compound, and a polyisocyanate compound.

The primary and/or secondary polyamine compound is a compound having two or more primary and/or secondary amino groups in a molecule and can amidate the rosin by a condensation reaction with a carboxy group contained in the rosins. To be specific, examples of the polyamine compound include chained diamines such as ethylenediamine, N-ethylaminoethylamine, 1,2-propanediamine, 1,3-propanediamine, N-methyl-1,3-propanediamine, bis(3-aminopropyl) ether, 1,2-bis(3-aminopropoxy)ethane, 1,3-bis(3-aminopropoxy)-2,2-dimethylpropane, 1,4-diaminobutane, and laurylaminopropylamine; cyclic diamines such as 2-aminomethylpiperidine, 4-aminomethylpiperidine, 1,3-di (4-piperidyl)-propane, and homopiperazine; polyamines such as diethylenetriamine, triethylenetetramine, iminobispropylamine, and methyliminobispropylamine; and furthermore, a hydrohalogenic acid salt thereof.

These primary and/or secondary polyamine compounds may be used alone or in combination of two or more.

The polyoxazoline compound is a compound having two or more polyoxazoline rings in a molecule and can amidate the rosin by an addition reaction with a carboxy group contained in the rosins. An example of the polyoxazoline compound includes 2,2'-(1,3-phenylene)-bis(2-oxazoline).

These polyoxazoline compounds may be used alone or in combination of two or more.

The polyisocyanate compound is a compound having two or more isocyanate groups in a molecule and can amidate the rosin by an addition condensation decarbonation reaction with a carboxy group contained in the rosins. Examples of the polyisocyanate compound include diisocyanates such as aromatic diisocyanate (for example, tolylene diisocyanate (2,4- or 2,6-tolylene diisocyanate or a mixture thereof), phenylene diisocyanate (m-, p-phenylene diisocyanate or a mixture thereof), 1,5-naphthalene diisocyanate, diphenylmethane diisocyanate (4,4'-, 2,4'-, or 2,2'-diphenylmethane diisocyanate or a mixture thereof), 4,4'-toluidine diisocyanate, and the like); araliphatic diisocyanate (for example, xylylene diisocyanate (1,3- or 1,4-xylylene diisocyanate or a mixture thereof), tetramethylxylylene diisocyanate (1,3- or 1,4-tetramethylxylylene diisocyanate or a mixture thereof), and the like); aliphatic diisocyanate (for example, 1,3-trimethylene diisocyanate, 1,4-tetramethylene diisocyanate, 1,5-pentamethylene diisocyanate, 1,6-hexamethylene diisocyanate, and the like); and alicyclic diisocyanate (for example, cyclohexane diisocyanate, 3-isocyanatomethyl-3,5,5-trimethylcyclohexyl isocyanate (isophorone diisocyanate), methylenebis(cyclohexylisocyanate), norbornane diisocyanate, and bis(isocyanatomethyl)cyclohexane) and furthermore, a derivative thereof (for example, a multimer, a polyol adduct, and the like).

These polyisocyanate compounds may be used alone or in combination of two or more.

These amidating agents may be used alone or in combination of two or more.

In the mixing ratio of the rosins to the amidating agent, the molar ratio (OH/active group) of the active group (primary and/or secondary amino group, polyoxazoline ring, and isocyanate group) of the amidating agent with respect to the carboxy group of the rosins is, for example, 0.2 to 1.2. In the reaction of the rosins with the polyhydric alcohols, the reaction temperature is, for example, 120 to 300° C. and the reaction time is, for example, 2 to 30 hours. In the reaction, a known catalyst can be blended at an appropriate proportion as needed.

The amine salt of rosin can be obtained by neutralizing the carboxy group contained in the rosins with a tertiary amine compound.

Examples of the tertiary amine compound include tri-C1-4 alkylamines such as trimethylamine and triethylamine and heterocyclic amines such as morpholine.

These tertiary amine compounds may be used alone or in combination of two or more.

These rosin resins may be used alone or in combination of two or more.

As the rosin resin, preferably, a rosin derivative is used, or more preferably, rosin esters are used.

In this method, the rosin resin can be used as it is, or can be, for example, used as a rosin emulsion, a saponified rosin, or the like as needed.

The rosin emulsion is, for example, produced by a solvent emulsification method, a solventless emulsification method, a phase inversion emulsification method, or another known emulsification method.

The emulsification method is not particularly limited and can be, for example, in accordance with a method described in the paragraph numbers [0024] to [0025] of Japanese Unexamined Patent Publication No. 2008-303269.

To be specific, for example, in the solvent emulsification method, first, the rosin resin is dissolved in an organic solvent, thereby obtaining a rosin resin solution. Examples of the organic solvent include chlorinated hydrocarbon solvents such as methylene chloride; aromatic solvents such as toluene and xylene; ketone solvents such as methyl ketone and methyl isobutyl ketone; and other solvents capable of dissolving the rosin resin. Next, separately, emulsion water prepared by mixing an emulsifier with water to be dissolved is prepared and the emulsion water and the above-described rosin resin solution are preliminarily mixed, thereby preparing an aqueous emulsion of coarse particles (preliminary emulsion). Thereafter, after the obtained aqueous emulsion is finely emulsified by using various mixers, a colloid mill, a high-pressure emulsifying apparatus, a high-pressure discharge emulsifying apparatus, a high shear-type emulsifying disperser, or the like, the organic solvent is removed, while being heated under normal pressure or reduced pressure.

In the solventless emulsification method, for example, the melted rosin resin and the emulsion water are preliminarily mixed under normal pressure or under pressure, thereby preparing an aqueous emulsion of coarse particles. Thereafter, the obtained aqueous emulsion is finely emulsified by using various emulsifying dispersers in the same manner as that described above.

In the phase inversion emulsification method, the rosin resin is heated and melted under normal pressure or under pressure. Thereafter, emulsion water is gradually added thereto, while the resulting rosin resin is stirred, so that a water-in-oil emulsion is first obtained to be then subjected to phase inversion into an oil-in-water emulsion. This method can be used in either method of the solvent method or the solventless method.

Examples of the emulsifier used in the above-described emulsification method include a nonionic emulsifier, an amphoteric emulsifier, and a synthetic polymer emulsifier.

Examples of the nonionic emulsifier include polyoxyethylene alkyl (or alkenyl) ethers such as polyoxyethylene lauryl ether and polyoxyethylene oleyl ether; polyoxyethylene alkyl phenyl ethers such as polyoxyethylene nonyl phenyl ether and polyoxyethylene styryl phenyl ether; sorbitan higher fatty acid esters such as sorbitan monolaurate and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monooleate; glycerin higher fatty acid esters such as monoglyceride oleate and monoglyceride stearate; and a polyoxyethylene-polyoxypropylene-block copolymer.

Examples of the amphoteric emulsifier include carboxybetaine, imidazolinebetaine, sulfobetaine, aminocarboxylic acid, a sulfated condensation product of ethylene oxide and/or propylene oxide with alkylamine or diamine, and a sulfonated adduct.

An example of the synthetic polymer emulsifier includes an aqueous dispersion polymer prepared by salt formation of a polymer that is obtained by polymerizing two or more polymerizable monomers with alkalis such as sodium hydroxide, potassium hydroxide, and ammonia to be dispersed or solubilized in water. Examples of the polymerizable monomer include styrene, α-methylstyrene, vinyltoluene, (meth)acrylic acid, maleic acid, (meth)acrylic acid esters, acrylamide, vinyl acetate, styrene sulfonic acid, isoprene sulfonic acid, vinyl sulfonic acid, allyl sulfonic acid, and 2-(meth)acrylamide-2-methylpropane sulfonic acid. These emulsifiers may be used alone or in combination of two or more.

These rosin emulsions may be used alone or in combination of two or more.

In the rosin emulsion, the solid content concentration of the rosin resin is, for example, 0.1 mass % or more, or preferably 1 mass % or more, and, for example, 99 mass % or less, or preferably 80 mass % or less.

The saponified rosin can be obtained by saponifying the rosin resin with a saponifier.

The saponifier is not particularly limited and a known saponifier can be used. Specific examples thereof include alkali metals such as potassium hydroxide and sodium hydroxide, and ammonia. These saponifiers may be used alone or in combination of two or more.

The saponified rosin has a saponification ratio of, for example, 1% or more, or preferably 10% or more, and usually, 100% or less.

The mixing ratio of the rosin resin to the saponifier is appropriately set in accordance with the kind of the rosin resin and the saponifier or the like so that the saponification ratio is within the above-described range.

In the saponification reaction, the reaction temperature is, for example, 0° C. or more, or preferably 10° C. or more, and, for example, 150° C. or less, or preferably 120° C. or less and the reaction time is, for example, 1 minute or more, or preferably 5 minutes or more, and, for example, 24 hours or less, or preferably 18 hours or less.

By this reaction, the saponified rosin can be obtained.

These saponified rosins may be used alone or in combination of two or more.

The saponified rosin can be used in a solvent-free state or as a saponified rosin solution by being dissolved in a solvent.

The solvent is not particularly limited and examples thereof include water, alcohols, ethers, ketones, esters, aliphatic hydrocarbons, and aromatic hydrocarbons. Preferably, water, alcohols, and ethers are used, or more preferably, water is used.

These solvents may be used alone or in combination of two or more.

In the saponified rosin solution, the solid content concentration of the saponified rosin is, for example, 1 mass % or more, or preferably 5 mass % or more, and, for example, 99 mass % or less, or preferably 80 mass % or less.

In the mixing ratio of the silica to the rosin resin in the mixing, the ratio of the rosin resin (in terms of solid content) with respect to 100 parts by mass of the silica is, for example, 0.1 parts by mass or more, or preferably 0.2 parts by mass or more, and, for example, 50 parts by mass or less, or preferably 5 parts by mass or less.

The method for mixing the silica with the rosin resin is not particularly limited and a known mixing method such as wet mixing or dry mixing can be used. Preferably, along with the silica and the rosin resin, a dispersion medium (solvent) is blended to be subjected to wet mixing.

In the wet mixing, for example, the silica, the rosin resin, and the dispersion medium may be collectively mixed; for example, the silica and the dispersion medium are mixed in advance and the rosin resin may be mixed with the obtained mixed liquid; or, for example, the rosin resin and the dispersion medium are mixed in advance and the silica may be mixed with the obtained dispersion liquid. Furthermore, for example, each of a silica dispersion liquid prepared by mixing the silica with the dispersion medium and a rosin resin dispersion liquid prepared by mixing the rosin resin with the dispersion medium is prepared in advance and these liquids may be mixed.

Preferably, the rosin resin is mixed with the dispersion medium in advance and thereafter, the obtained dispersion liquid is mixed with the silica.

The dispersion medium is not particularly limited and examples thereof include water, alcohols, ethers, ketones, esters, aliphatic hydrocarbons, and aromatic hydrocarbons. Preferably, water, alcohols, and ethers are used, or more preferably, water is used.

The mixing ratio of the dispersion medium with respect to 100 parts by mass of the rosin resin (solid content) is, for example, 1 part by mass or more, or preferably 10 parts by mass or more, and, for example, 25000 parts by mass or less, or preferably 18000 parts by mass or less.

Next, in this method, the silica is added to the obtained dispersion liquid (mixed liquid of the rosin resin with the dispersion medium) to be mixed at the above-described mixing proportion.

In this method, for example, various additives including granulation auxiliaries and processing auxiliaries such as a silane coupling agent, a polyacrylamide (PAM) resin, carboxymethyl cellulose (CMC), and polyvinyl alcohol (PVA); furthermore, an antioxidant; a flame retardant; a heat-resistant stabilizer; an ultraviolet absorber; a pigment; an antistatic agent; and an extender can be blended at an appropriate proportion as needed.

The additive may be, for example, blended in at least any of the silica, the rosin resin, and the dispersion medium in advance or may be simultaneously blended at the time of mixing of these.

In the mixing, for example, a known mixing device can be used. Examples thereof include known blenders and mixers such as a Henschel mixer, a high-speed mixer, a uniaxial or biaxial screw-type kneader, and a roller kneader.

In this manner, a mixture of the silica and the rosin resin can be obtained. The obtained mixture is, for example, in a dispersion liquid state, in a paste state, or the like.

In this method, the silica is agglomerated by using the mixture obtained as described above, thereby obtaining agglomerated silica.

To be specific, the obtained mixture is, for example, agglomerated and molded with a diskpelleter granulator, an extruder, a compression molding machine, a stirrer, a fluidized bed granulator, or the like to be then dried with a dryer such as a fluidized bed dryer, a simple heater, or the like.

In the drying conditions, the drying temperature is, for example, 0° C. or more, or preferably 5° C. or more, and, for example, 200° C. or less, or preferably 150° C. or less and the drying time is, for example, 1 minute or more, or preferably 2 minutes or more, and, for example, 48 hours or less, or preferably 18 hours or less.

The agglomerated silica obtained by the method has an average particle size of, for example, 0.015 mm or more, or preferably 0.1 mm or more, and, for example, 50 mm or less, or preferably 30 mm or less. The measurement method of the average particle size is in accordance with JIS Z 8801-1 (in 2006) (hereinafter, the same).

When the average particle size of the agglomerated silica is within the above-described range, the scattering at the time of the use thereof can be prevented. Furthermore, for example, improvement of the dispersibility at the time of the use thereof by being mixed with resin or the like can be achieved.

Also, for example, the rosin resin is added to a silica slurry at the above-described proportion to be subjected to spray drying, so that agglomerated silica (silica powder containing rosin) can be obtained.

In the spray drying, for example, a known spray dryer can be used.

In the drying conditions, the inlet temperature of the spray dryer is, for example, 100° C. or more, or preferably 200° C. or more, and, for example, 1000° C. or less, or preferably 720° C. or less, and the outlet temperature thereof is, for example, 50° C. or more, or preferably 90° C. or more, and, for example, 700° C. or less, or preferably 250° C. or less.

The agglomerated silica obtained by the spray drying method has an average particle size of, for example, 50 µm or more, or preferably 60 µm or more, and, for example, 900 µm or less, or preferably 300 µm or less.

When the average particle size of the agglomerated silica is within the above-described range, the scattering at the time of the use thereof can be prevented. Furthermore, for example, improvement of the dispersibility at the time of the use thereof by being mixed with resin or the like can be achieved.

The agglomerated silica can be also subjected to compression treatment with a known compression apparatus as needed.

The agglomerated silica (after drying) obtained in this manner has the solvent (dispersion medium) content (the water content, when the dispersion medium is water) of, for example, 20 mass % or less, or preferably 10 mass % or less. The solvent content can be measured by using a known moisture meter or the like.

The agglomerated silica has bulk density of, for example, 0.01 $g/cm^3$ or more, or preferably 0.05 $g/cm^3$ or more, and, for example, 2 $g/cm^3$ or less, or preferably 1 $g/cm^3$ or less.

When the bulk density of the agglomerated silica is within the above-described range, the scattering at the time of the use thereof can be prevented. Furthermore, for example, improvement of the dispersibility at the time of the use thereof by being mixed with resin or the like can be achieved.

The above-described agglomerated silica contains the rosin resin, so that improvement of the vulcanizing rate at the time of being blended in a vulcanizable rubber composition can be achieved.

The above-described agglomerated silica contains the rosin resin, so that the agglomerated silica is further more surely agglomerated and the scattering thereof can be prevented. Thus, when the agglomerated silica is blended in the rubber composition or the like, improvement of the filling rate and the smoothing of the mixing amount can be achieved. Furthermore, when the rubber composition is used as a vehicle tire with low fuel consumption, excellent low fuel consumption and excellent mechanical strength can be developed.

According to the above-described method for producing agglomerated silica, the agglomerated silica that is capable of improving the vulcanizing rate at the time of being blended in the vulcanizable rubber composition can be efficiently obtained.

Furthermore, according to the above-described method for producing agglomerated silica, the silica can be further more surely agglomerated. Thus, when the agglomerated silica is blended in the rubber composition or the like, improvement of the filling rate and the smoothing of the mixing amount can be achieved.

Thus, preferably, the above-described agglomerated silica is, for example, used in a rubber composition that requires the filling rate of the silica and the vulcanizing rate.

To be more specific, the rubber composition of the present invention contains the above-described agglomerated silica, the rubber component, and a vulcanizing agent.

The rubber component is not particularly limited and an example thereof includes a diene rubber.

The diene rubber is not particularly limited and examples thereof include a natural rubber (NR), a styrene butadiene rubber (SBR), a butadiene rubber (BR), an isoprene rubber (IR), a butyl rubber (IIR), an acrylonitrile butadiene rubber (NBR), an ethylene propylene diene rubber (EPDM), and a chloroprene rubber (CR).

These rubber components may be used alone or in combination of two or more.

In view of improvement of the strength and the abrasion resistance of a molded product to be obtained, as the rubber component, preferably, a natural rubber (NR), a styrene butadiene rubber (SBR), and a butadiene rubber (BR) are used, or more preferably, a styrene butadiene rubber (SBR) and a butadiene rubber (BR) are used in combination.

When the styrene butadiene rubber (SBR) and the butadiene rubber (BR) are used in combination, in the combination ratio, the ratio of the styrene butadiene rubber (SBR) with respect to 100 parts by mass of the total amount of the styrene butadiene rubber (SBR) and the butadiene rubber (BR) is, for example, 40 parts by mass or more, or preferably 60 parts by mass or more, and, for example, 95 parts by mass or less, or preferably 85 parts by mass or less. The ratio of the butadiene rubber (BR) with respect to 100 parts by mass of the total amount of the styrene butadiene rubber (SBR) and the butadiene rubber (BR) is, for example, 5 parts by mass or more, or preferably 15 parts by mass or more, and, for example, 60 parts by mass or less, or preferably 40 parts by mass or less.

When the combination ratio of the styrene butadiene rubber (SBR) and the butadiene rubber (BR) is within the above-described range, improvement of the strength and the abrasion resistance of the molded product to be obtained can be achieved.

The total amount of the rubber composition and the mixing proportion of the rubber component with respect to the agglomerated silica is appropriately set in accordance with the purpose and application.

Examples of the vulcanizing agent include sulfur and a vulcanizing accelerator.

The sulfur is not particularly limited and examples thereof include powdered sulfur, precipitated sulfur, colloid sulfur, insoluble sulfur, and highly dispersible sulfur. The sulfur may be used alone or in combination of two or more.

The mixing ratio of the sulfur with respect to 100 parts by mass of the rubber component is, for example, 0.5 parts by mass or more, or preferably 1 part by mass or more, and, for example, 5 parts by mass or less, or preferably 3 parts by mass or less.

Examples of the vulcanizing accelerator include a zinc oxide, a stearic acid, furthermore, a sulfenamide vulcanizing accelerator (N-tert-butyl-2-benzothiazolyl sulfenamide (TBBS), N-cyclohexyl-2-benzothiazolyl sulfenamide (CBS), N,N-dicyclohexyl-2-benzothiazolyl sulfenamide (DCBS), N,N-diisopropyl-2-benzothiazole sulfenamide, and the like), and a guanidine vulcanizing accelerator (diphenylguanidine (DPG), diorthotolylguanidine, triphenylguanidine, orthotolylbiguanide, diphenylguanidine phthalate, and the like).

These vulcanizing accelerators may be used alone or in combination of two or more.

The mixing proportion of the vulcanizing accelerator is appropriately set in accordance with the purpose and application.

Furthermore, for example, known various additives can be blended in the rubber composition at an appropriate proportion as needed. Examples thereof include a deterioration inhibitor (for example, antiozonant, thermal deterioration inhibitor, oxidation deterioration inhibitor), a crack inhibitor, a silane coupling agent, a vulcanizing accelerator, furthermore, a vulcanizing auxiliary, a vulcanizing retarder, a vulcanizing activator, a plasticizer, a softener, an oxidation inhibitor, and a filler.

The additive may be, for example, blended in at least any of the above-described components in advance or may be simultaneously blended at the time of mixing of these.

The rubber composition can be obtained by mixing the above-described components.

The mixing method is not particularly limited and can be, for example, performed by using a known rubber kneader such as a roller, Banbury mixer, and a kneader. The mixing conditions are not particularly limited and can be appropriately set in accordance with a device to be used or the like.

The rubber composition contains the above-described agglomerated silica, so that the vulcanizing rate is excellent. Furthermore, the above-described agglomerated silica is contained, so that the filling rate of the silica is high and the smoothing of the mixing amount can be achieved. Furthermore, when the rubber composition is used as a vehicle tire with low fuel consumption, excellent low fuel consumption and excellent mechanical strength can be developed.

According to the above-described method for producing a rubber composition, the rubber composition having excellent vulcanizing rate can be obtained. Furthermore, according to the above-described method for producing a rubber composition, the filling rate of the silica can be improved and the smoothing of the mixing amount can be achieved.

When the filling rate of the silica is high, the specific gravity of the rubber composition is high, so that the filling rate of the silica can be evaluated by obtaining the specific gravity of the rubber composition. The specific gravity and the filling rate of the obtained rubber composition are appropriately set in accordance with the purpose and application.

The above-described rubber composition is used in production of various rubber molded products that require the filling rate of the silica and the vulcanizing rate and among all, preferably used in production of a vehicle tire with low fuel consumption.

The method for producing a tire by using the above-described rubber composition is not particularly limited and a known vulcanizing and molding method can be used.

That is, for example, the rubber composition in an unvulcanized state is extruded in accordance with the shape of the tire and is attached to another tire member (for example, side wall portion, shoulder portion, beat portion, inner liner, or the like) on a tire molding machine, thereby forming an unvulcanized tire. Next, the resulting unvulcanized tire is thermally pressurized to be vulcanized in a vulcanizer.

The tire obtained in this manner contains the above-described agglomerated silica, so that the vulcanizing rate is excellent. Furthermore, the above-described agglomerated silica is contained, so that the filling rate of the silica is high and the smoothing of the mixing amount can be achieved. Furthermore, the above-described agglomerated silica is contained, so that excellent low fuel consumption and excellent mechanical strength can be developed.

Thus, preferably, the tire is, for example, used for a tire for various vehicles such as automobiles, motorcycles, and railway vehicles (for example, monorail and the like) and a tire for aircrafts.

EXAMPLES

Next, while the present invention is described in further detail with reference to Examples and Comparative Examples, the present invention is not limited to any of them by no means. All designations of "part" or "parts" and "%" mean part or parts by mass and % by mass, respectively, unless otherwise particularly specified. The numeral values in Examples shown below can be replaced with the numeral values described in the embodiments (that is, the upper limit value or the lower limit value).

<Production of Agglomerated Silica>

Example 1

As a rosin resin, 5 parts by mass of ethylene oxide adducts of rosin (polyethylene glycol esterified product of rosin (ethylene oxide average addition mole number: 30), REO-30, manufactured by Harima Chemicals Groups, Inc.) and as a processing auxiliary, 1 part by mass of a styrene-acrylic acid copolymer (amine salt of copolymer (acid value of 195, weight average molecular weight of 10000) obtained by copolymerization of styrene with methacrylic acid at a mass ratio of 7 to 3, solid content of 28%) were added to 180 parts by mass of water, thereby preparing a mixed liquid.

Next, the total amount of the obtained mixed liquid was added to 100 parts by mass of Nipsil AQ (BET specific surface area of 205 $m^2/g$, dry bulk density of 0.25 $g/cm^3$, silica powder, manufactured by Tosoh Silica Corporation) to be stirred, thereby preparing a silica paste.

Thereafter, the obtained silica paste was pelletized with an extrusion granulator (12VR-250SDX, manufactured by Kire Royal Co., Ltd.) to be then dried at 110° C. with a dryer (PH-301, manufactured by ESPEC Corp.) for one night, thereby obtaining agglomerated silica.

The agglomerated silica had an average particle size of 4 mm, the water content of 4.6 mass %, and the bulk density of 0.26 $g/cm^3$.

Example 2

Agglomerated silica was obtained in the same manner as in Example 1, except that as a rosin resin, 5 parts by mass of glycerine esterified products of rosin (DS-70L, manufactured by Harima Chemicals Group, Inc.) were used.

The agglomerated silica had an average particle size of 4 mm, the water content of 4.4 mass %, and the bulk density of 0.27 $g/cm^3$.

Example 3

Agglomerated silica was obtained in the same manner as in Example 1, except that as a rosin resin, 5 parts by mass of amide compounds of rosin (FLEX-REZ™ 1084AS C, manufactured by Lawter) were used.

The agglomerated silica had an average particle size of 4 mm, the water content of 4.5 mass %, and the bulk density of 0.27 $g/cm^3$.

Example 4

After 800 parts by mass of tall rosins (HARTALL R-WW, manufactured by Harima Chemicals Group, Inc.) were dissolved in 2000 parts by mass of ethanol at 70° C., 153 parts by mass of 2-aminoethanol was added thereto to be stirred. Thereafter, 2000 parts by mass of water was carefully added so as not to extremely lower the temperature, thereby obtaining an aqueous solution of amine salt of rosin.

Next, agglomerated silica was obtained in the same manner as in Example 1, except that as a solid content, 5 parts by mass of the obtained aqueous solutions of amine salt of rosin were used.

The agglomerated silica had an average particle size of 4 mm, the water content of 5.0 mass %, and the bulk density of 0.28 g/cm$^3$.

<Rubber Composition>

Example 5

A Banbury mixer (MIXTRON BB MIXER/BB-L1800, manufactured by KOBE STEEL, LTD.) was charged with 80 parts by mass of styrene butadiene rubbers (SBR) (SL-563, manufactured by JSR Corporation) and 20 parts by mass of polybutadiene rubbers (BR) (JSR BR-51, manufactured by JSR Corporation) to be then kneaded at 45 rpm for 30 seconds.

After 30 seconds, 63 parts by mass of agglomerated silica obtained in Example 1, 2 parts by mass of antiozonants (OZONONE 6C, manufactured by Seiko Chemical Co., Ltd.), 1.5 parts by mass of thermal/oxidation deterioration inhibitors (NONFLEX RD, manufactured by Seiko Chemical Co., Ltd.), a surface-crack inhibitor (SUNTIGHT, manufactured by Seiko Chemical Co., Ltd.), 2 parts by mass of zinc oxides (vulcanizing accelerator) (zinc white, manufactured by Hakusui Tech Co., Ltd.), 2 parts by mass of stearic acids (vulcanizing accelerator) (stearic acid "Tsubaki™", manufactured by NOF CORPORATION), and 4.8 parts by mass of silane coupling agents (Si69, manufactured by EVONIK INDUSTRIES) were charged thereto to be then kneaded at 60 rpm until the temperature of the composition reached 130° C. Thereafter, when the composition reached 130° C., the mixer was temporarily stopped and adhering components attached to the inner walls of the mixer were dropped therein. Thereafter, the resulting composition was kneaded at 80 rpm until the temperature thereof reached 160° C.

Next, the composition was taken out from the mixer and put into a rubber mill (Φ200 mm×L500 mm mixing mill, manufactured by Nippon Roll MFG. Co., Ltd.).

Thereafter, 1.5 parts by mass of sulfur (dispersible powdered sulfur, manufactured by Yabu Shoten Co., Ltd.), 2 parts by mass of vulcanizing accelerators (SANCELER D, manufactured by SANSHIN CHEMICAL CO., LTD.), and 1.7 parts by mass of vulcanizing accelerators (SANCELER CM-G, manufactured by SANSHIN CHEMICAL CO., LTD.) were put thereto, while being kneaded with the rubber mill, and kneaded and plowed, thereby obtaining a rubber composition containing silica.

Example 6

A rubber composition was obtained in the same manner as in Example 5, except that 63 parts by mass of agglomerated silica obtained in Example 2 were blended instead of 63 parts by mass of agglomerated silica obtained in Example 1.

Example 7

A rubber composition was obtained in the same manner as in Example 5, except that 63 parts by mass of agglomerated silica obtained in Example 3 were blended instead of 63 parts by mass of agglomerated silica obtained in Example 1.

Example 8

A rubber composition was obtained in the same manner as in Example 5, except that 63 parts by mass of agglomerated silica obtained in Example 4 were blended instead of 63 parts by mass of agglomerated silica obtained in Example 1.

Comparative Example 1

A rubber composition was obtained in the same manner as in Example 5, except that 60 parts by mass of silica powders (Nipsil AQ, manufactured by Tosoh Silica Corporation) and 3 parts by mass of ethylene oxide adducts of rosin (ethylene glycol esterified product of rosin, REO-30, manufactured by Harima Chemicals Groups, Inc.) were blended instead of 63 parts by mass of agglomerated silica obtained in Example 1.

Comparative Example 2

A rubber composition was obtained in the same manner as in Example 5, except that 60 parts by mass of silica powders (Nipsil AQ, manufactured by Tosoh Silica Corporation) and 3 parts by mass of glycerine esterified products of rosin (DS-70L, manufactured by Harima Chemicals Groups, Inc.) were blended instead of 63 parts by mass of agglomerated silica obtained in Example 1.

Comparative Example 3

A rubber composition was obtained in the same manner as in Example 5, except that 60 parts by mass of silica powders (Nipsil AQ, manufactured by Tosoh Silica Corporation) and 3 parts by mass of amide compounds of rosin (FLEX-REZ™ 1084AS C, manufactured by Lawter) were blended instead of 63 parts by mass of agglomerated silica obtained in Example 1.

Comparative Example 4

Operation was performed in the same manner as in Example 5, except that 60 parts by mass of silica powders (Nipsil AQ, manufactured by Tosoh Silica Corporation) and 3 parts by mass (solid content) of amine salts of rosin used in Example 4 were blended instead of 63 parts by mass of agglomerated silica obtained in Example 1.

However, the amine salt of rosin that was used was an aqueous solution, so that it failed to fit the rubber component and was incapable of being uniformly mixed therewith and thus, a rubber composition was not obtained.

Comparative Example 5

A rubber composition was obtained in the same manner as in Example 5, except that 60 parts by mass of silica powders (Nipsil AQ, manufactured by Tosoh Silica Corporation) were blended instead of 63 parts by mass of agglomerated silica obtained in Example 1.

<Evaluation>

(Specific Gravity)

The specific gravity of each of the rubber compositions obtained in Examples and Comparative Examples was measured in accordance with JIS K 6268 (in 1998).

As the specific operation procedure, first, a test piece was produced from the rubber composition and the mass thereof was measured in the air. Next, a beaker was filled with distilled water, the test piece was immersed therein, and the mass was measured at a reference temperature (23±2° C. or 27±2° C.).

The specific gravity was calculated by the following formula.

$$\rho = m_1/(m_1 - m_2)$$

$m_1$=mass of test piece measured in the air
$m_2$=mass of test piece obtained by subtracting the mass of water having the same volume as the test piece obtained in underwater weighing at the reference temperature The results are shown in Table 1 and FIG. 1.

(Vulcanizing Rate)

The vulcanizing rate of each of the rubber compositions obtained in Examples and Comparative Examples was measured by the following operation.

Scorch Time:

The test piece of the rubber composition was set in an automatic Mooney viscometer (SMV-202, manufactured by Shimadzu Corporation) to be preliminarily heated at a test temperature for 1 minute. After pre-heating, a rotor was immediately rotated and the time (scorch time (MS5UP)) when the Mooney viscosity increased from the lowest value by 5 Mooney units (M) was measured.

Vulcanizing Time:

The test piece of the rubber composition was put on a pedestal of a curelastometer (Curelastometer V, manufactured by ORIENTEC CO., LTD.) to be then vulcanized at 170° C. for 20 minutes. Then, the time required for the test piece to increase up to 10%, 50%, and 90% with respect to the maximum torque was defined as the 10% vulcanizing time, the 50% vulcanizing time, and the 90% vulcanizing time, respectively.

Figure 2:
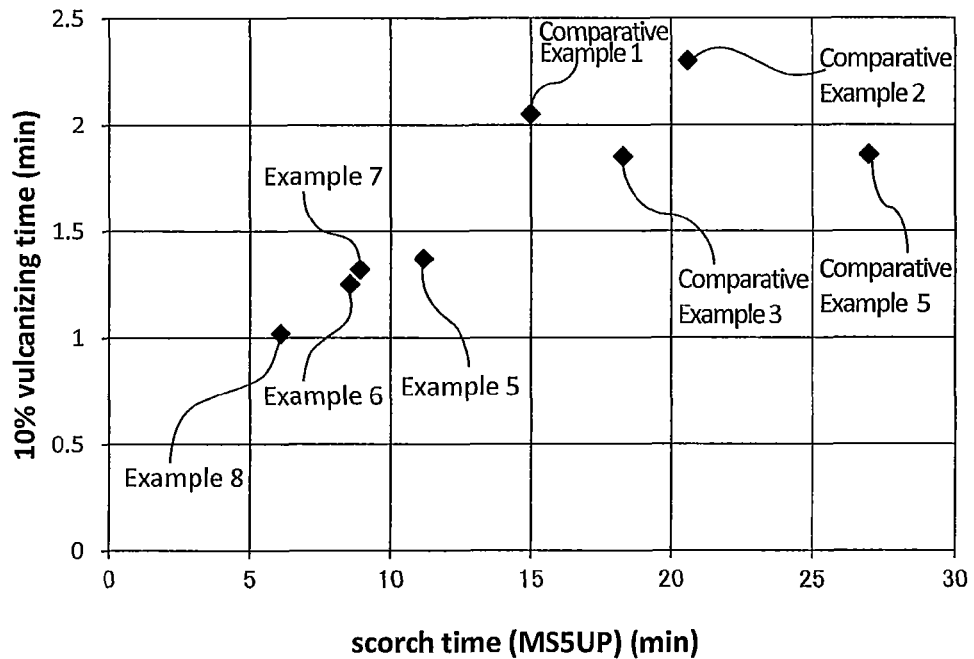
FIG. 2 shows a graph illustrating the relationship between the 10% vulcanizing time and the scorch time (MS5UP) of each of the rubber compositions obtained in Examples and Comparative Examples.
Figure 3:
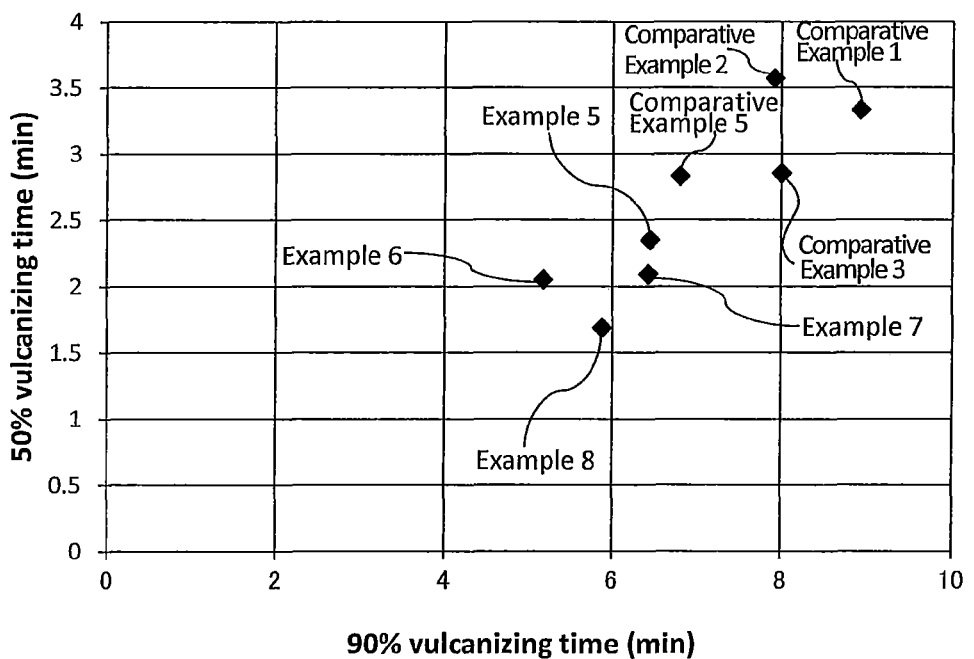
FIG. 3 shows a graph illustrating the relationship between the 50% vulcanizing time and the 90% vulcanizing time of each of the rubber compositions obtained in Examples and Comparative Examples.

The relationship between the 10% vulcanizing time and the scorch time (MS5UP) that are measured is shown in Table 1 and FIG. 2. The relationship between the 50% vulcanizing time and the 90% vulcanizing time is shown in Table 1 and FIG. 3.

It shows that the lower the numeral values are, the faster the vulcanizing rate is.

(Consideration)

It was confirmed that when the agglomerated silica obtained by mixing and agglomerating the silica and the rosin resin were used, the specific gravity of the rubber composition was high, that is, the filling rate of the silica was excellent and furthermore, the vulcanizing rate was fast, compared to a case where the silica and the rosin resin were separately added without agglomeration thereof and a case where the agglomerated silica obtained by agglomerating the silica without mixing the rosin resin was used.

TABLE 1

| | No. | | | |
|---|---|---|---|---|
| | Ex. 5 | Ex. 6 | Ex. 7 | Ex. 8 |
| Specific Gravity | 1.185 | 1.181 | 1.18 | 1.19 |
| Scorch Time (MS5UP) [min] | 11.17 | 8.55 | 8.9 | 6.1 |
| 10% Vulcanizing Time [min] | 1.37 | 1.25 | 1.32 | 1.02 |
| 50% Vulcanizing Time [min] | 2.35 | 2.05 | 2.09 | 1.69 |
| 90% Vulcanizing Time [min] | 6.45 | 5.18 | 6.43 | 5.88 |

TABLE 1-continued

| | No. | | | | |
|---|---|---|---|---|---|
| | Comp. Ex. 1 | Comp. Ex. 2 | Comp. Ex. 3 | Comp. Ex 4 | Comp. Ex. 5 |
| Specific Gravity | 1.173 | 1.164 | 1.176 | Mixing Impossible | 1.171 |
| Scorch Time (MS5UP) [min] | 14.98 | 20.59 | 18.28 | | 27 |
| 10% Vulcanizing Time [min] | 2.05 | 2.3 | 1.85 | | 1.86 |
| 50% Vulcanizing Time [min] | 3.33 | 3.57 | 2.85 | | 2.83 |
| 90% Vulcanizing Time [min] | 8.93 | 7.92 | 8 | | 6.8 |

Change of Kind of Silica Powder
<Production of Agglomerated Silica>

Example 9

As a rosin resin, 5 parts by mass of ethylene oxide adducts of rosin (polyethylene glycol esterified product of rosin (ethylene oxide average addition mole number: 30), REO-30, manufactured by Harima Chemicals Groups, Inc.) and as a processing auxiliary, 1 part by mass of a styrene-acrylic acid copolymer (amine salt of copolymer (acid value of 195, weight average molecular weight of 10000) obtained by copolymerization of styrene with methacrylic acid at a mass ratio of 7 to 3, solid content of 28%) were added to 180 parts by mass of water, thereby preparing a mixed liquid.

Next, the total amount of the obtained mixed liquid was added to 100 parts by mass of NEWSIL 175GR (BET specific surface area of 165 to 185 $m^2/g$, silica powder, manufactured by Quechen Silicon Chemical Co., Ltd.) to be stirred, thereby preparing a silica paste.

Thereafter, the obtained silica paste was pelletized with an extrusion granulator (12VR-250SDX, manufactured by Kire Royal Co., Ltd.) to be then dried at 110° C. with a dryer (PH-301, manufactured by ESPEC Corp.) for one night, thereby obtaining agglomerated silica.

The agglomerated silica had an average particle size of 4.2 mm and the water content of 4.5 mass %.

Example 10

Agglomerated silica was obtained in the same manner as in Example 9, except that as a rosin resin, 5 parts by mass of ethylene oxide adducts of rosin (polyethylene glycol esterified product of rosin (ethylene oxide average addition mole number: 15), REO-15, manufactured by Harima Chemicals Groups, Inc.) were used.

The agglomerated silica had an average particle size of 4.0 mm and the water content of 4.8 mass %.

Example 11

Agglomerated silica was obtained in the same manner as in Example 9, except that as a rosin resin, 5 parts by mass of tall rosins (HARTALL R-WW, manufactured by Harima Chemicals Group, Inc.) were used.

The agglomerated silica had an average particle size of 3.9 mm and the water content of 4.8 mass %.

Comparative Example 6

Agglomerated silica was obtained in the same manner as in Example 9, except that a rosin resin was not blended.

The agglomerated silica had an average particle size of 4.2 mm and the water content of 4.7 mass %.

Comparative Example 7

Agglomerated silica was obtained in the same manner as in Example 9, except that 5 parts by mass of polyethylene glycols (number average molecular weight of 4000, manufactured by Wako Pure Chemical Industries, Ltd.) were blended instead of the rosin resin.

The agglomerated silica had an average particle size of 4.1 mm and the water content of 4.5 mass %.

<Rubber Composition>

Example 12

A Banbury mixer (MIXTRON BB MIXER/BB-L1800, manufactured by KOBE STEEL, LTD.) was charged with 80 parts by mass of styrene butadiene rubbers (SBR) (SL-563, manufactured by JSR Corporation) and 20 parts by mass of polybutadiene rubbers (BR) (JSR BR-51, manufactured by JSR Corporation) to be then kneaded at 60 rpm for 30 seconds.

After 30 seconds, 31.5 parts of agglomerated silica obtained in Example 9, 6 parts by mass of silane coupling agents (Si75, manufactured by EVONIK INDUSTRIES), and 2 parts by mass of stearic acids (vulcanizing accelerator) (stearic acid "Tsubaki™", manufactured by NOF CORPORATION) were charged thereto to be then kneaded at 60 rpm for 30 seconds.

Thereafter, 31.5 parts of agglomerated silica obtained in Example 9, 2 parts by mass of antiozonants (OZONONE 6C, manufactured by Seiko Chemical Co., Ltd.), 1.5 parts by mass of thermal/oxidation deterioration inhibitors (NONFLEX RD, manufactured by Seiko Chemical Co., Ltd.), 1.5 parts by mass of surface-crack inhibitors (SUNTIGHT S, manufactured by Seiko Chemical Co., Ltd.), and 2 parts by mass of zinc oxides (vulcanizing accelerator) (zinc white, manufactured by Hakusui Tech Co., Ltd.) were charged thereto to be then kneaded at 60 rpm until the temperature of the composition reached 130° C. Thereafter, when the composition reached 130° C., the mixer was temporarily stopped and adhering components attached to the inner walls of the mixer were dropped therein. Thereafter, the resulting composition was kneaded at 60 rpm for 30 seconds, while the temperature thereof was kept at 145 to 150° C.

Next, the composition was taken out from the mixer and put into a rubber mill (Φ200 mm×L500 mm mixing mill, manufactured by Nippon Roll MFG. Co., Ltd.).

Thereafter, sulfur, a vulcanizing accelerator (SANCELER D, manufactured by SANSHIN CHEMICAL CO., LTD.), and a vulcanizing accelerator (SANCELER CM-G, manufactured by SANSHIN CHEMICAL CO., LTD.) were put thereto, while being kneaded with the rubber mill, and kneaded and plowed.

Thereafter, the obtained composition was put into a Banbury mixer again to be kneaded at 60 rpm for 30 seconds, thereby obtaining a rubber composition containing silica.

Example 13

A rubber composition was obtained in the same manner as in Example 12, except that the agglomerated silica obtained in Example 10 were blended instead of the agglomerated silica obtained in Example 9.

Example 14

A rubber composition was obtained in the same manner as in Example 12, except that the agglomerated silica obtained in Example 11 were blended instead of the agglomerated silica obtained in Example 9.

Comparative Example 8

A rubber composition was obtained in the same manner as in Example 12, except that the agglomerated silica obtained in Comparative Example 6 were blended instead of the agglomerated silica obtained in Example 9.

Comparative Example 9

A rubber composition was obtained in the same manner as in Example 12, except that the agglomerated silica obtained in Comparative Example 7 were blended instead of the agglomerated silica obtained in Example 9.

<Evaluation>

(Specific Gravity—Vulcanizing Rate)

The specific gravity and the vulcanizing rate (vulcanizing time) of each of the rubber compositions obtained in Examples and Comparative Examples were measured by the above-described method. The results are shown in Table 2.

(Reinforcing Properties (Mechanical Strength))

By using each of the rubber compositions obtained in Examples and Comparative Examples, a JIS 3 dumbbell-shaped test piece was punched and subjected to a tensile test at a tensile rate of 500 mm/min in accordance with JIS K6251 (in 2004). Then, the 100% modulus ($M_{100}$) [MPa], the 200% modulus ($M_{200}$) [MPa], and the 300% modulus ($M_{300}$) [MPa] were measured at room temperature. The results are shown in Table 2.

(Low Fuel Consumption)

Each of the rubber compositions obtained in Examples and Comparative Examples was served as a measurement sample and the maximum value of tan δ of each of the measurement samples was measured at a test piece width of 5 mm, a temperature of 60° C., a frequency of 10 Hz, and initial distortion of 2 mm by using a dynamic viscoelasticity measuring device: "Rheogel-4000" (manufactured by Rheology Co., Ltd.). It was judged that the lower the maximum value of tan δ was, the more excellent the low fuel consumption was. The results are shown in Table 2.

TABLE 2

| | No. | | | | |
|---|---|---|---|---|---|
| | Ex. 12 | Ex. 13 | Ex. 14 | Comp. Ex. 8 | Comp. Ex. 9 |
| Specific Gravity | 1.179 | 1.180 | 1.180 | 1.175 | 1.182 |
| 10% Vulcanizing Time [min] | 2.75 | 2.79 | 2.21 | 4.59 | 4.74 |
| 50% Vulcanizing Time [min] | 3.20 | 3.21 | 2.88 | 6.10 | 6.49 |
| Reinforcing Properties (M100) [MPa] | 3.47 | 3.39 | 3.65 | 2.35 | 3.13 |
| Reinforcing Properties (M200) [MPa] | 6.90 | 6.66 | 7.19 | 4.96 | 6.02 |
| Reinforcing Properties (M300) [MPa] | 11.20 | 10.72 | 11.57 | 8.31 | 9.54 |
| Low Fuel Consumption tan δ | 0.12 | 0.12 | 0.14 | 0.11 | 0.13 |

Change of Drying and Agglomeration Method
<Production of Agglomerated Silica>

Example 15

A commercially available sodium silicate and pure water were mixed so that the concentration of the sodium silicate was 5%. Next, a 22 mass % sulfuric acid was added thereto until the neutralization rate was 100%, thereby obtaining wet silica.

The obtained wet silica was repeatedly filtered and washed, thereby preparing a silica slurry having a silica concentration of 24 mass %.

Thereafter, as a rosin resin, 5 parts by mass of ethylene oxide adducts of rosin (polyethylene glycol esterified product of rosin (ethylene oxide average addition mole number: 30), REO-30, manufactured by Harima Chemicals Groups, Inc.) were added to 417 parts by mass of the obtained silica slurry, thereby preparing a mixed slurry.

Next, the obtained mixed slurry was sprayed and dried under the conditions of an inlet temperature of 250° C. and an outlet temperature of 118° C. with a spray dryer: "PJ-MiniMax" (manufactured by Powdering Japan), thereby obtaining agglomerated silica as dry particles.

The agglomerated silica had an average particle size of 71 μm and the water content of 4.6 mass %.

Comparative Example 10

Agglomerated silica was obtained in the same manner as in Example 15, except that a rosin resin was not blended.

The agglomerated silica had an average particle size of 122 μm and the water content of 4.8 mass %.

<Rubber Composition>

Example 16

A rubber composition was obtained in the same manner as in Example 12, except that the agglomerated silica obtained in Example 15 were blended instead of the agglomerated silica obtained in Example 9.

Comparative Example 11

A rubber composition was obtained in the same manner as in Example 12, except that the agglomerated silica obtained in Comparative Example 10 were blended instead of the agglomerated silica obtained in Example 9.

<Evaluation>

(Specific Gravity—Vulcanizing Rate—Mechanical Strength—Low Fuel Consumption)

The specific gravity, the vulcanizing rate (vulcanizing time), the mechanical strength (reinforcing properties (tensile strength)), and the low fuel consumption (tan δ) of each of the rubber compositions obtained in Examples and Comparative Examples were measured by the above-described method. The results are shown in Table 3.

TABLE 3

| | No. | |
|---|---|---|
| | Ex. 16 | Comp. Ex. 11 |
| Specific Gravity | 1.179 | 1.179 |
| 10% Vulcanizing Time [min] | 3.10 | 3.19 |
| 50% Vulcanizing Time [min] | 4.27 | 4.61 |
| Reinforcing Properties (M100) [MPa] | 3.13 | 2.88 |
| Reinforcing Properties (M200) [MPa] | 6.63 | 6.03 |
| Reinforcing Properties (M300) [MPa] | 10.91 | 9.99 |
| Low Fuel Consumption tan δ | 0.15 | 0.15 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The agglomerated silica, the rubber composition, the method for producing agglomerated silica, and the method for producing a rubber composition of the present invention are used in production of various rubber molded products that require the filling rate of the silica and the vulcanizing rate and among all, preferably used in production of a vehicle tire with low fuel consumption. The tire of the present invention is preferably used as a vehicle tire with low fuel consumption.

The invention claimed is:

1. Agglomerated silica obtained by mixing silica with a rosin resin to be agglomerated,
   wherein an average particle size of the agglomerated silica is 0.015 mm or more and 30 mm or less, and
   a mixing ratio of the rosin resin with respect to 100 parts by mass of the silica is 5 parts by mass or less.

2. A rubber composition comprising the agglomerated silica according to claim 1, a rubber component, and a vulcanizing agent, the agglomerated silica being obtained by mixing silica with a rosin resin to be agglomerated and the rubber composition having a specific gravity of from 1.179 to 1.190.

3. A tire obtained by using the rubber composition according to claim 2.

4. A method for producing the agglomerated silica according to claim 1, comprising wet mixing of silica with a rosin resin and a dispersion medium to be agglomerated, the method comprising:
   mixing the rosin resin with the dispersion medium to obtain a dispersion liquid; and
   after the step of obtaining the dispersion liquid, mixing the dispersion liquid and the silica to obtain agglomerated silica.

5. A method for producing a rubber composition comprising the steps of:
   producing agglomerated silica by the method for producing the agglomerated silica according to claim 4, and
   after the step of producing the agglomerated silica, mixing the agglomerated silica, a rubber component, and a vulcanizing agent.

* * * * *